United States Patent
Dunko et al.

(10) Patent No.: US 7,548,748 B2
(45) Date of Patent: Jun. 16, 2009

(54) PROGRAMMABLE REMOTE UNIT FOR OPERATING A COMMUNICATION DEVICE

(75) Inventors: Gregory A. Dunko, Cary, NC (US); Stephen K. Forbes, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 176 days.

(21) Appl. No.: 11/010,811

(22) Filed: Dec. 13, 2004

(65) Prior Publication Data

US 2006/0148464 A1 Jul. 6, 2006

(51) Int. Cl.
H04M 3/00 (2006.01)
(52) U.S. Cl. ...................................... 455/419; 455/420
(58) Field of Classification Search .............. 455/412.1, 455/414.1, 414.3, 415, 418, 419, 420, 41.1–41.3
See application file for complete search history.

(56) References Cited

U.S. PATENT DOCUMENTS

| | | | |
|---|---|---|---|
| 6,339,706 B1 | 1/2002 | Tillgren et al. | |
| 6,633,759 B1 * | 10/2003 | Kobayashi | 455/419 |
| 7,010,268 B2 * | 3/2006 | Chen | 455/41.2 |
| 7,016,704 B2 * | 3/2006 | Pallakoff | 455/566 |
| 2001/0039190 A1 * | 11/2001 | Bhatnagar | 455/450 |
| 2003/0092399 A1 | 5/2003 | Davies | |
| 2004/0235514 A1 * | 11/2004 | Bloch et al. | 455/550.1 |

FOREIGN PATENT DOCUMENTS

EP 1271903 1/2003

OTHER PUBLICATIONS

PCT International Search Report, International Application No. PCT/US2005/030343, Dec. 28, 2005.

* cited by examiner

*Primary Examiner*—Sam Bhattacharya
(74) *Attorney, Agent, or Firm*—Coats & Bennett, P.L.L.C.

(57) ABSTRACT

A method and apparatus for controlling a function of a communication device by a remote unit. The method may comprise receiving a user input identifying a selected function that can be performed by the communication device, and receiving a control signal corresponding to a selected control on the remote unit. The method may further comprise associating the selected function to the control signal such that in the future, receiving the control signal from the remote unit results in the communication device performing the selected function. The device may include a cellular radio transceiver; and a short-range wireless transceiver. The communication device may include a processor configured to communicate with a remote unit and receive user input identifying a selected function, and receive a control signal from the remote unit corresponding to a selected control on the remote unit. The processor is configured to associate the selected function to the control signal, and perform the selected function when the control signal is received from the remote unit.

20 Claims, 4 Drawing Sheets

PROGRAMMABLE REMOTE UNIT FOR OPERATING A COMMUNICATION DEVICE

BACKGROUND

Mobile devices have many embedded applications that are activated by physically contacting one or more keys on the device. One example is a push-to-talk application that requires the user to press a key on the face of the device to activate the function. In certain instances, the user may not be able to physically press the desired key on the device and therefore is unable to use the application. For example, the user may be operating a vehicle and unable to divert their attention to the mobile device to visually find the correct key. This may be aggravated by the physical location of the device in the vehicle that may cause it to be physically and/or visually inaccessible.

In another instance, the user may be legally not able to directly activate the device. In many areas of the country, such as New York State, it is illegal to converse on a cellular telephone while driving a vehicle unless the driver employs some sort of hands-free device. Those drivers caught conversing over the cellular phone without the use of a hands-free device face stiff monetary penalties. Remote operation of the device for use in a "hands-free" application would provide a legal and safe manner of using the device.

In still another instance, the user is unable/unwilling to press the key. The mobile device may be mounted in a cradle requiring the user to physically move from their present location and press the desired key. One embodiment includes the user mounting the phone in their office physically away from their workstation. It may be inconvenient for the user to get up and activate the device.

SUMMARY

The present invention is directed to a method and apparatus for controlling a function of a communication device by a remote unit. One method comprises receiving a user input identifying a selected function that can be performed by the communication device. A control signal is received from the remote unit corresponding to a selected control on the remote unit. The communication device then associates the selected function with the control signal. After the association between the selected function and control signal is made, the communication device performs the selected function when it receives the control signal from the remote unit.

One embodiment of an apparatus that can be controlled by a remote unit includes a communication device having a cellular radio transceiver; and a short-range wireless transceiver. The communication device also includes a processor configured to communicate with a remote unit. The communication device receives user input identifying a selected function and a control signal from the remote unit corresponding to a selected control on the remote unit. The processor is configured to associate the selected function with the control signal, and perform the selected function when the control signal is subsequently received from the remote unit.

DETAILED DESCRIPTION

Figure 1:
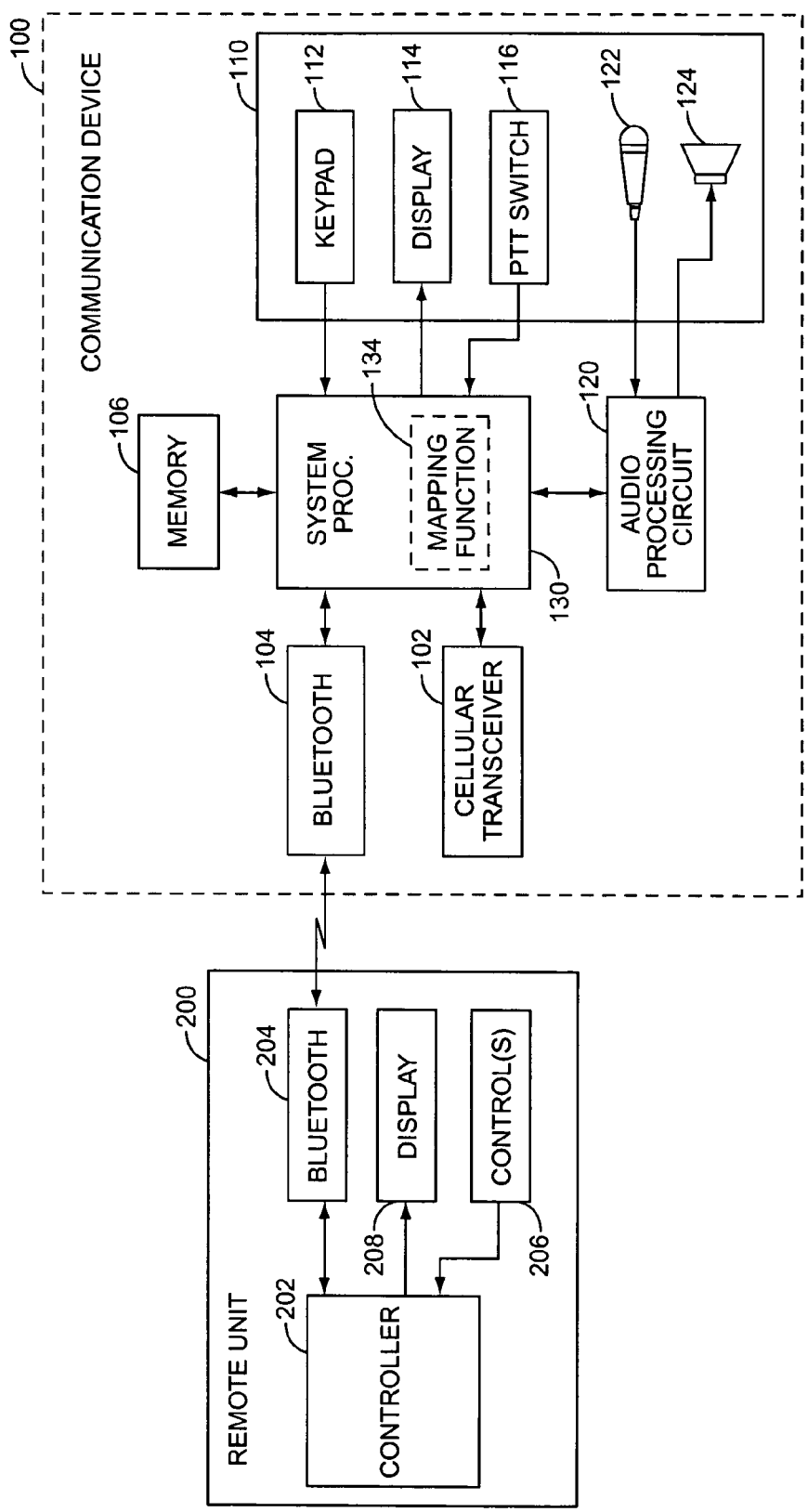
FIG. 1 is a schematic diagram of a mobile unit and a remote unit according to one embodiment of the present invention.

FIG. 1 illustrates a block diagram of an exemplary communication device 100 and remote unit 200 according to one embodiment of the present invention. Communication device 100 includes cellular transceiver 102, memory 106, user interface 110, audio processing circuit 120, and system processor 130. User interface 110 includes one or more user input devices 112 and a display 114 to enable the user to interact with and control communication device 100. The user input devices 112 may include a keypad, touchpad, joystick control dials, control buttons, other input devices, or a combination thereof. In one embodiment, the communication device 100 includes a push-to-talk (PTT) switch 116, which is shown separately in FIG. 1. User input devices 112 allow the operator to enter numbers, characters, or commands, scroll through menus and menu items presented to the user on interface display 114, and make selections. Display 114 allows the user to view information such as menus and menu items, dialed digits, images, call status information, and output from user applications.

User interface 110 may also include a microphone 122 and speaker 124. Microphone 122 receives audio input from the user, while speaker 124 projects audible sound to the user. In particular, microphone 122 converts the detected speech and other audible signals into electrical audio signals and speaker 124 converts analog audio signals into audible signals that can be heard by the user. Audio processing circuit 120 receives analog audio inputs from microphone 122 and provides the basic analog output signals to speaker 124. It will be appreciated that the audio processing circuit 120 in communication device 100 may include a voice recognition system (not shown) that receives and processes vocal instructions from the user.

System processor 130 performs various processing tasks, including controlling the overall operation of communication device 100 according to programs stored in memory 106. Memory 106 may include both random access memory (RAM) and read-only memory (ROM). Computer program instructions and data required for operation of communication device 100 are stored in non-volatile memory, such as EPROM, EEPROM, and/or flash memory, which may be implemented as discrete devices, stacked devices, or integrated with system processor 130.

The system processor 130 may be implemented in hardware, firmware, software, or a combination thereof, and may comprise a single microprocessor or multiple microprocessors. The microprocessors may be general-purpose microprocessors, digital signal processors, or other special purpose processors. Functions performed by system processor 130 may include signal processing and/or control of the overall operation of mobile device 100. In accordance with the present invention, and as discussed in greater detail below, system processor 130 includes a mapping function 134.

To communicate with other communication devices, communication device 100 includes a cellular transceiver 102 and a short-range transceiver 104. Cellular transceiver 102 may operate according to any known standard, such as Global System for Mobile Communications (GSM), TIA/EIA-136, cdmaOne, cdma2000, UMTS, and Wideband CDMA. Transceiver 102 may include baseband processing circuits to process signals transmitted and received by the transceiver 102. Alternatively, baseband processing circuits may be incorporated with system processor 130.

Transceiver 104 may comprise, for example, a Bluetooth® transceiver. Bluetooth® is a universal radio interface that enables two or more wireless devices to communicate wirelessly via short-range ad hoc networks. A brief overview of the Bluetooth® standard is given in Jaap Haartsen, "Bluetooth®—The universal radio interface for ad hoc, wireless connectivity," Ericsson Review No. 3, 1998. While the present application may use the term "Bluetooth® transceiver" and "Bluetooth® network" to refer to a wireless interface for short-range communications, those skilled in the art will appreciate that the present invention is not limited to Bluetooth® systems and equipment, and that other short-range wireless interfaces, e.g., infra-red interfaces and 802.11 interfaces, are equally applicable.

Remote unit 200 enables the user to remotely control the communication device 100. Remote unit 200 may comprise, for example, a hands-free unit. The remote unit 200 may be integrated into a vehicle, or may be a portable unit. Remote unit 200 includes a controller 202 to control operation of the remote unit 200, one or more controls 206, and a short-range transceiver 204. Controller 202 may be implemented in hardware, firmware, software, or a combination thereof, and may comprise a single microprocessor or multiple microprocessors. The microprocessors may be general-purpose microprocessors, digital signal processors, or other special purpose processors. Controller 202 may further have associated memory (not illustrated) in any matter of forms for storing programs and data necessary for operation.

One or more controls 206 permit remote control of the communication device 100 through the remote unit 200. The controls 206 may include a push button, keypad, touchpad, jogdial, joystick control, dials, and other like physical mechanisms. A single control 206, or a plurality of controls 206 may be provided.

Remote unit 200 communicates with the communication device 100 via the short-range transceiver 204. The short-range transceiver 204 may comprise a Bluetooth® transceiver or other short-range wireless interface. Control signals generated by manipulation of the controls 206 are sent to the communication device 100 by the remote unit 200. How the communication device 100 responds to the control signals can be programmed by the user.

Figure 2:
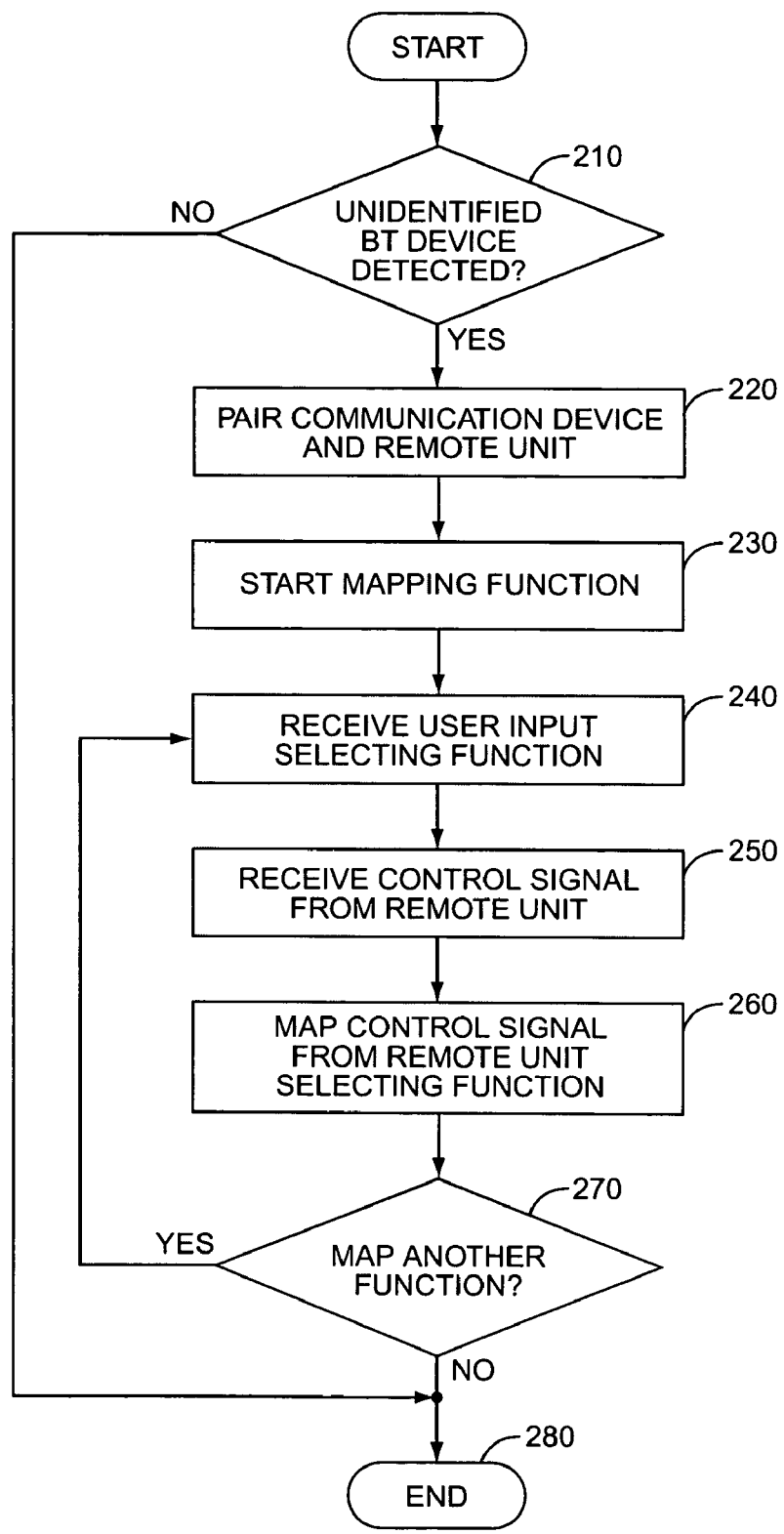
FIG. 2 is a flowchart diagram of a method of mapping functions within the communication device to input sequences by the remote unit according to one embodiment of the present invention.

FIGS. 2 and 3 illustrate one method of assigning the functions of the communication device 100 to a control 206 of the remote unit 200. The process shown in FIG. 2 may use the Bluetooth® Human Interface Device (HID) profile. Initially, the communication device 100 is placed in a discovery mode to find and connect with the remote unit 200. Using the embodiment of FIG. 1, this may involve having the Bluetooth® interface enabled on the communication device 100. At the same time, the remote device 200 is enabled and made discoverable, such as by activating a specific control 206, or by activating one or more controls 206 in a predetermined manner. Once both are enabled, the communication device 100 detects the previously un-identified remote unit 200 (step 210). The communication device 100 and remote unit 200 are then paired (step 220). Pairing may involve the user inputting through the input device 112 a pass code that is transmitted to the remote unit 200. The pairing process creates a unique identifier in the communication device 100 that is assigned to the remote unit 200.

Once the communication device 100 and remote device 200 are paired, a program stored in memory 106 is initiated to start a mapping function (step 230). The communication device 100 may determine the capabilities of the remote unit 200, such as the number or type of controls (e.g., number of input buttons, joystick, etc.), or the input format of the controls (e.g., extended press of input button, simultaneous presses, etc.). The program prompts the user to associate a function within the communication device 100 with a control 206 on the remote unit 200. This includes choosing the desired function (step 240), and assigning it to a control signal from the remote unit (step 250). The control signal may result from activation of a single control 206, e.g., push control button, or activation of multiple controls. The communication device 100 then maps the selected function with the received control signal (step 260). The pairing is stored in the communication device 100. When the control sign is subsequently received by the communication device 100, it activates the selected function of the communication device 100.

After the initial function is mapped, other functions may also be mapped in a similar manner. If additional mapping is necessary, the user is prompted to select the next function (block 270) and the assignment process repeats. If no additional functions are to be mapped, the user can terminate the mapping function.

The control signal received from the remote unit 200 may result from a variety of inputs from the control 206. Examples include a single press of a control button, multiple presses of a control button, an extended press of a control button, etc. Control signals can also be generated by activating controls 206 in combination. For example, two or more push buttons may be activated simultaneously or in a sequence to generate a single control signal. The user may select a simple signal (e.g., single press of control button) for functions that are commonly used (e.g., push-to-talk). More complicated signals (multiple button presses or extended press) may be selected for less frequent functions. The number of different control signals that can be created by the control 206 and differentiated by the communication device 100 may vary depending upon the sophistication of the communication device 100 and/or remote unit 200. Each of the control signals is unique and can be differentiated by the communication device 100.

Figure 3A:
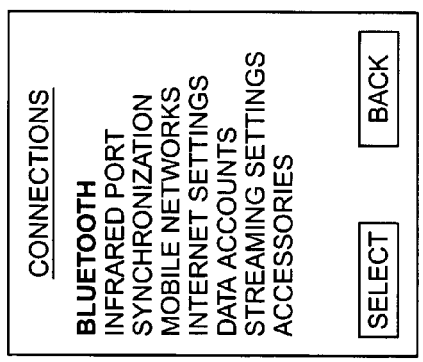
FIGS. 3a-3c illustrate exemplary display screens presented to a user on the display of the communication device for pairing the mobile unit with the remote unit.
Figure 3B:
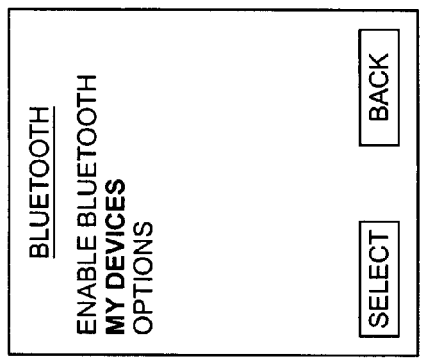
Figure 3C:
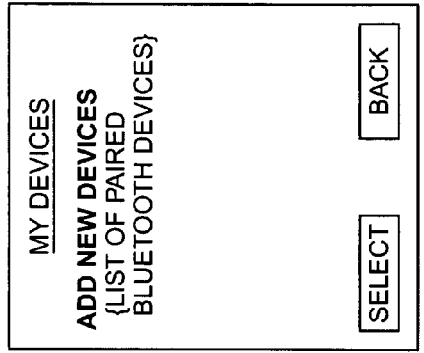

FIGS. 3A-C illustrate a sequence of display screens that may be presented on the display 114 of the communication device 100 to pair the communication device 100 with the remote unit 200. In FIG. 3A, the user is presented with a screen for enabling and configuring connections with remote devices. In this screen, the user selects the Bluetooth® option (shown in bold) to enable the Bluetooth® interface. The user is then presented with the Bluetooth® menu shown in FIG. 3B. This menu allows the user to enable/disable the Bluetooth®, and to discover other Bluetooth®-enabled devices. The user selects the menu item "My Devices" on the Bluetooth® menu and is presented with the menu shown in FIG. 3C. The "My Devices" menu includes a list of paired Bluetooth® devices. The menu item "Add New Devices" allows the user to place the Bluetooth® interface into a discovery mode to find and appear with other Bluetooth® devices. The user selects "Add New Devices" to place the Bluetooth® transceiver in discovery mode.

Figure 4A:
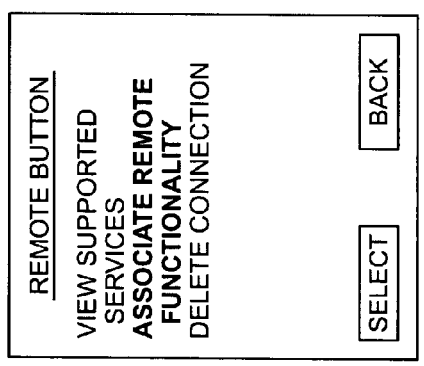
FIGS. 4a-4c illustrate exemplary display screens presented to a user on the display of the communication device for mapping control of the remote unit to specific functions of the mobile unit.
Figure 4B:
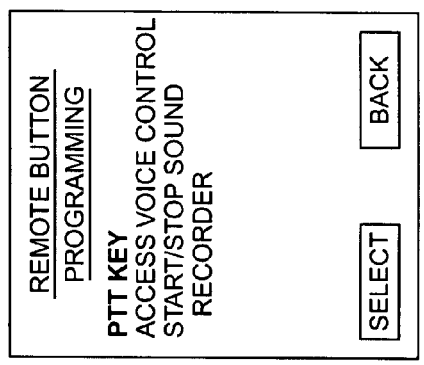
Figure 4C:
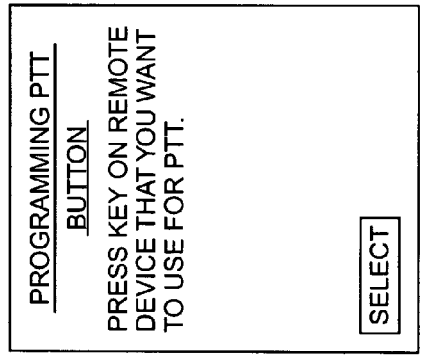

FIGS. 4A-4C disclose exemplary menus for mapping controls of the remote unit 200 to specific functions of the communication device 100. The display screen shown in FIG. 4A may be presented to the user once the communication device 100 is paired with a remote unit 200 with a programmable control. The remote button menu gives the user the option of associating a control 206 with a specific function of the communication device 100. This option is labeled "Associate Remote Functionality" in FIG. 4A and is shown in bold. When selected, the user is presented with the programming menu shown in FIG. 4B titled "Remote Button Programming." The "Remote Button Programming" menu presents the user with functions that can be associated with a control 206 of the remote unit 200. The list of functions is intended to be illustrative. Those skilled in the art will appreciate that other functions could also be remotely controlled. In this example, the user selects the PTT key function. The user is then presented with the display screen shown in FIG. 4C, prompting the user to press a key on the remote unit 200 that the user wishes to use as a PTT key. When the user presses a button on the remote unit 200, a control signal is then generated and sent to the communication device 100. The communication device 100 assigns the received control signal to the PTT key function.

When the communication device 100 is moved out of range from the remote unit 200, the devices are no longer able to communicate. The user may be notified by an indication shown on the display 114 of the communication device 100. When the devices are not able to communicate, the communication device 100 may perform a periodic search to attempt to locate the remote unit 200. The specifics of how often the communication device 100 searches, and the manner of searching depends on the specific embodiments that may be programmed by the user, or as defined by the Bluetooth® standard. Once the communication device 100 is back in range of the remote unit 200 and detected, an indication may also be shown on the display 114 to notify the user.

Figure 5:
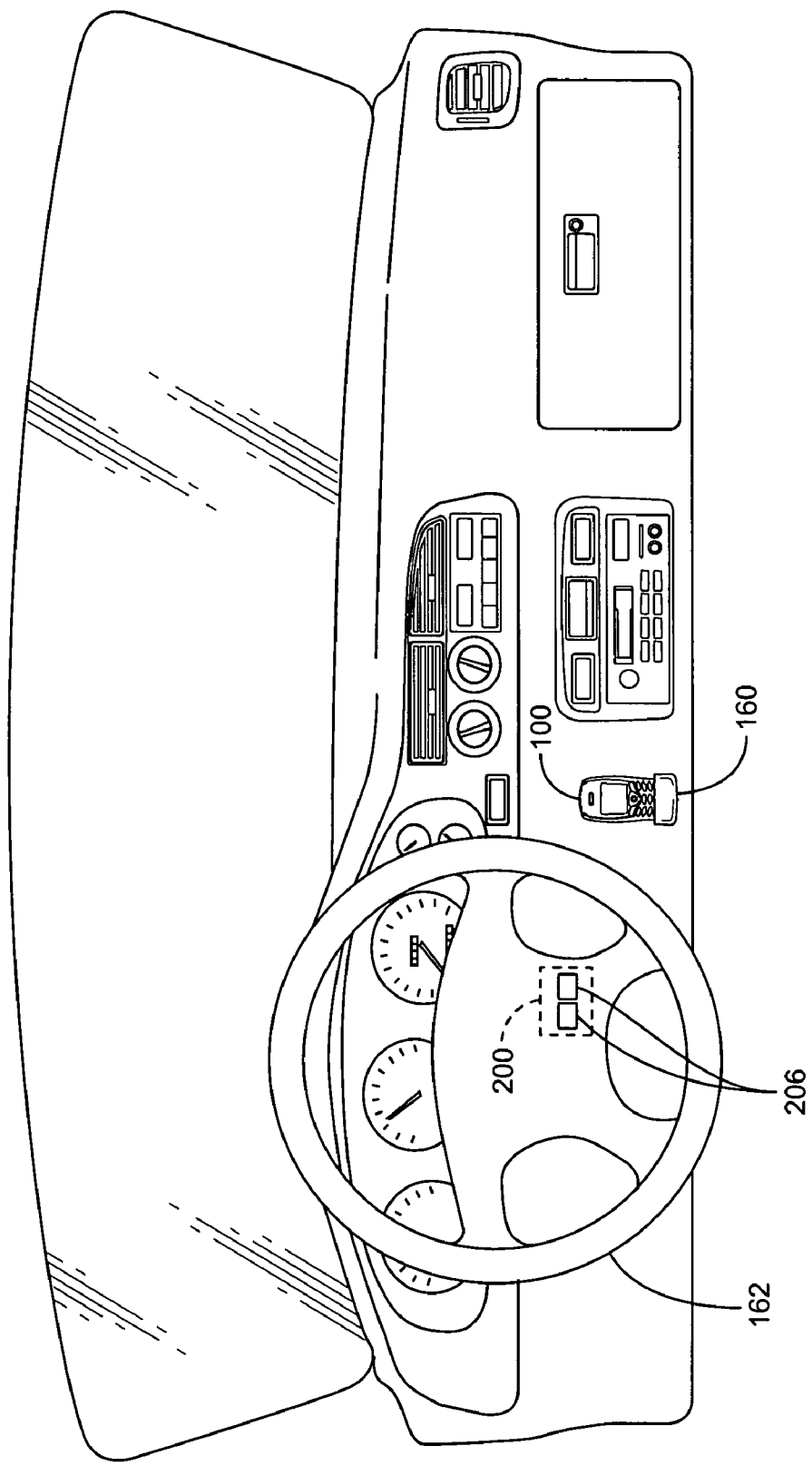
FIG. 5 is a schematic illustration of an application of the present invention within a vehicle according to one embodiment of the present invention.

FIG. 5 illustrates one application of the present invention for use within a vehicle. The communication device 100 is mounted within a cradle 160 adjacent to the drivers seat. The remote unit 200 is incorporated within the vehicle with the control 206 positioned on the steering wheel 162. In this embodiment, the control 206 comprises two separate control buttons. For purposes of this example, assume that two functions from the communication device 100 have already been mapped to the remote unit 200: a push-to-talk (PTT) function has been mapped to a single press of a first control button; and a sound recorder has been mapped to an extended press of a second control button. As the user is operating the vehicle and wishes to utilize the PTT function, they use the first control button and enter the associated input sequence. The user is then able to use this function of the device 100 without having to actually contact the device itself. Later, the user may use the sound recorder by entering the input sequence into the second control button.

In the embodiment of FIG. 5, remote unit 200 is installed within the vehicle. This may be done by the manufacturer of the vehicle, or may be added to the vehicle at a later time after manufacture. The remote unit 200 may further be powered by the vehicle battery, or may include a separate power source. In one embodiment, the communication device 100 communicates with the remote unit 200 through fixed wiring within the vehicle connecting to the cradle 160 and remote unit 200. Prior to insertion of the device 100 within the cradle 160, wireless communication may or may not be possible between the device 100 and remote unit 200.

The wireless communication device 100 recognizes each different remote unit 200 as it comes in range with through the unique identifier that is assigned during the first encounter. A single communication device 100 may assign different identifiers to numerous different remote units 200. By way of example, a first remote device 200 in the user's vehicle may be assigned a first identifier and be mapped with a first set of functions and signals. A second remote device 200 in the user's office will be assigned a second identifier that is different from the first. The second remote device 200 may have the same or different functions and input sequences mapped as the first remote device.

The functions that may be mapped to the remote unit 200 may include all functions within the communication device 100, or a subset of the functions. In one embodiment, the available functions that may be mapped are listed on the display 114. The user may toggle through the list and select the desired functions. Specific functions that may be mapped include push-to-talk, voice control, and starting and stopping a sound recorder.

The communication device 100 may further include a dedicated mechanism on the communication device 100 to start the pairing process. When the mechanism is activated, the communication device 100 searches for the remote unit 200. Activation of the dedicated mechanism may leave the communication device 100 in constant pairing mode that requires a positive deactivation, or the pairing mode may last for only a limited amount of time. While activated, a message or icon may be shown on the display 114 to notify the user. In one specific embodiment, the dedicated mechanism may be a depressible button on the face of the communication device.

The mapping of the functions on the communication device 100 to the remote unit 200 may be changed. When desired, the user of the communication device 100 launches the mapping program and changes the previously-assigned signals and functions. By way of example, the user may initially map a specific control 206 to control the PTT function. At some point in the future, the user may decide to change the mapping such that the same control 206 now operates the sound recorder. To change the mapping, the user merely launches the mapping function and re-assigns the control signal that was previously assigned to the PTT function to the sound recorder. Prior to re-assigning the same signal to a new function, a prompt may appear on the display 114 asking the user to confirm the remapping request.

In the method described in FIG. 2, the mapping function was performed at the communication device 100. Input commands and displays were each associated with the communication device 100. The remote unit 200 may also provide for programming the mapping sequence. The remote unit 200 may include a display 208 that can illustrate prompts for directing the user how to perform the mapping of the communication device 100. The input mechanism 206 may be used for responding to the prompts and associating the various functions and signals.

As used herein, the term "communication device" may include a cellular wireless transceiver with or without a multi-line display; a Personal Communication System (PCS) terminal that may combine a wireless transceiver with data processing, facsimile, and data communication capabilities; a Personal Digital Assistant (PDA) that can include a wireless transceiver, pager, Internet/intranet access, web browser, organizer, calendar, and/or a global positioning system (GPS) receiver; a conventional laptop and/or palmtop receiver; a pager; or any other mobile device that includes a wireless transceiver to communicate information via a wireless interface. In addition, the term "communication device" may include a computer or any other digital communication device that includes a transceiver to communicate information via a cable interface.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of controlling a function of a mobile communication device by a remote unit that is distanced from the mobile communication device, the method comprising the steps of:
   programming a mobile communication device by:
      receiving, at the mobile communication device, user input identifying a user-selected function of the mobile communication device;
      receiving, at the mobile communication device, a control signal from the remote unit corresponding to a user-selected control on the remote unit; and
      executing, at the mobile communication device, a mapping function to associate the user-selected function with the control signal; and
   thereafter, receiving the control signal from the remote unit and performing the user-selected function at the mobile communication device responsive to the control signal.

2. The method of claim 1, further comprising receiving the user input through an input device positioned on the communication device.

3. The method of claim 1, further comprising displaying a plurality of function options to the user on a display prior to the step of receiving the user input identifying the user-selected function.

4. The method of claim 3, further comprising displaying a push-to-talk function, a voice control function, and a sound recorder function.

5. The method of claim 1, wherein receiving the control signal from the remote unit comprises receiving an input sequence.

6. The method of claim 1, further comprising receiving the control signal from the remote unit over a short-range interface.

7. The method of claim 1, further comprising remapping the user-selected function to a different control signal.

8. The method of claim 1, further comprising changing the manner of activation of the user-selected function from the remote unit.

9. A method of controlling a function of a mobile communication device by a remote unit that is distanced from the mobile communication device, the method comprising the steps of:
   programming a mobile communication device by:
      identifying the remote unit through a wireless interface;
      initiating a mapping function at the mobile communication device;
      receiving, at the mobile communication device, user input identifying a user-selected function of the communication device;
      receiving, at the mobile communication device, a control signal from the remote unit corresponding to a user-selected control on the remote unit; and
      associating, at the mobile communication device, the user-selected function with the control signal; and
   thereafter, receiving the control signal from the remote unit and performing the user-selected function at the mobile communication device responsive to the control signal.

10. The method of claim 9, further comprising receiving the user input identifying the function over the wireless interface.

11. The method of claim 9, further comprising receiving the user input identifying the function through an input device on the communication device.

12. The method of claim 9, further comprising remapping the function.

13. A method of operating a mobile communication device from a remote unit located a distance from the mobile communication device, the method comprising the steps of:
   programming a mobile communication device by:
      identifying the remote unit over a short range wireless interface;
      initiating a mapping function at the mobile communication device;
      receiving, at the mobile communication device, a control signal from the remote unit corresponding to a user-selected control on the remote unit;
      assigning, at the mobile communication device, a first user-selected function of the communication device to the remote unit; and
      assigning, at the mobile communication device, the control signal to the first user-selected function; and
   thereafter, receiving the control signal from the remote unit and performing the first user-selected function at the mobile communication device responsive to the control signal.

14. The method of claim 13, further comprising remapping the first user-selected function to a different control signal.

15. The method of claim 14, further comprising mapping a second user-selected function to the control signal, the second user-selected function being different from the first user-selected function.

16. A method of controlling a function of a mobile communication device by a remote unit that is distanced from the mobile communication device, the method comprising the steps of:
   programming a mobile communication device by:
      identifying the remote unit over a short-range interface;
      displaying, at the mobile communication device, a plurality of functions that are performed by the communication device;
      receiving, at the mobile communication device, input from a user identifying a user-selected function from the plurality of functions;
      receiving, at the mobile communication device, a control signal from the remote unit corresponding to a user-selected control on the remote unit; and
      associating, at the mobile communication device, the control signal with the user-selected function; and
   thereafter, receiving the control signal from the remote unit and performing the user-selected function at the mobile communication device responsive to the control signal.

17. The method of claim 16, further comprising displaying a first image indicating that the communication device is in range of the remote unit.

18. The method of claim 16, further comprising displaying a second image indicating that the communication device is out of range of the remote unit.

19. The method of claim 16, further comprising remapping the user-selected function to a different control signal.

20. A mobile communication device comprising:
   a cellular radio transceiver;
   a short-range wireless transceiver; and
   a processor configured to:

program the mobile communication device to perform a user-selected function by:
  communicating with a remote unit to receive user input identifying the user-selected function;
  receiving a control signal from the remote unit corresponding to a user-selected control on the remote unit; and
  executing a mapping function to associate the user-selected function with the control signal; and
perform the user-selected function when the control signal is thereafter received from the remote unit.

* * * * *